May 23, 1961 C. E. LEJA 2,985,227
RESILIENT SEAT SUPPORT
Filed Sept. 30, 1957 2 Sheets-Sheet 1
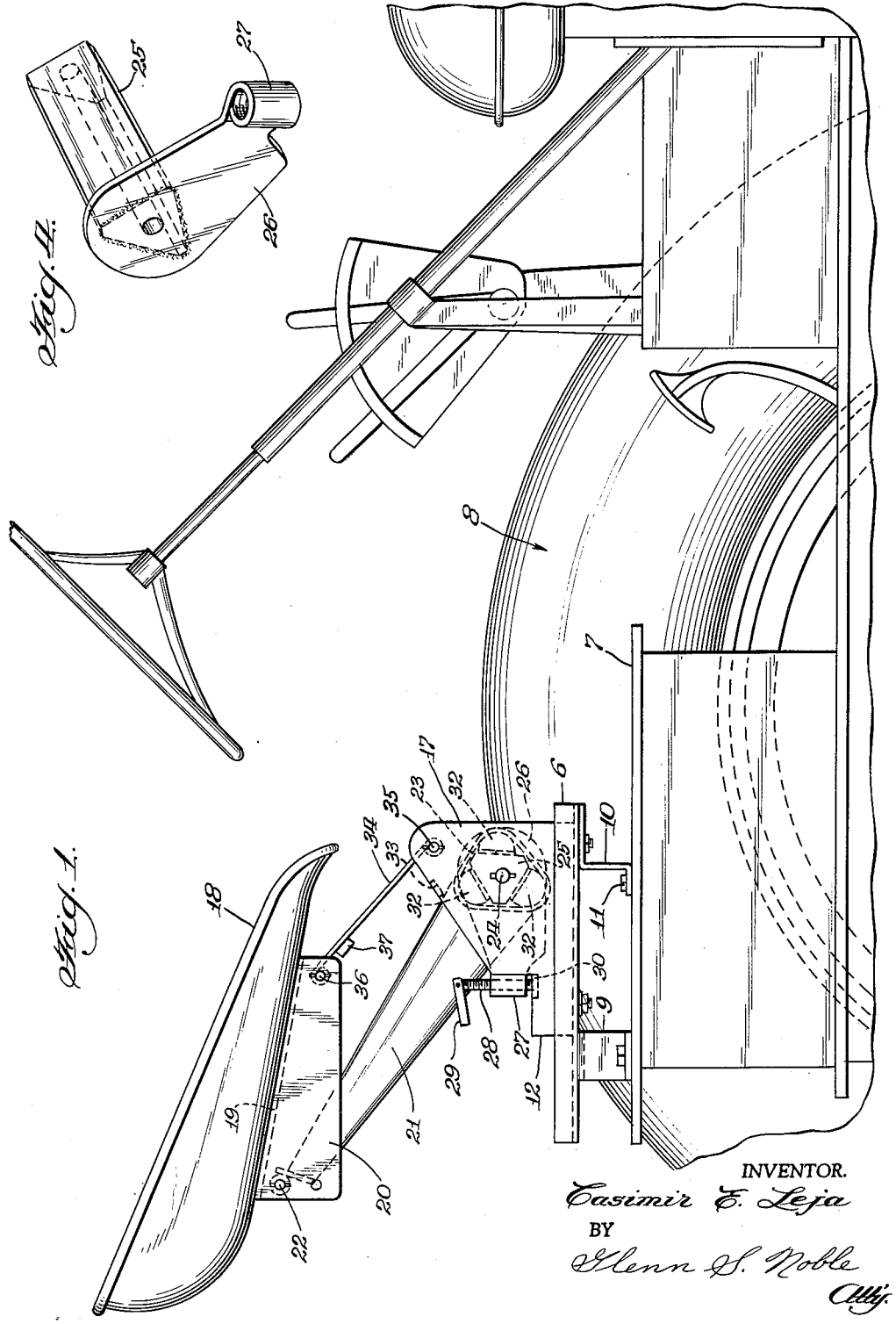
INVENTOR.
Casimir E. Leja
BY
Glenn S. Noble
Atty.

May 23, 1961 C. E. LEJA 2,985,227
RESILIENT SEAT SUPPORT
Filed Sept. 30, 1957 2 Sheets-Sheet 2
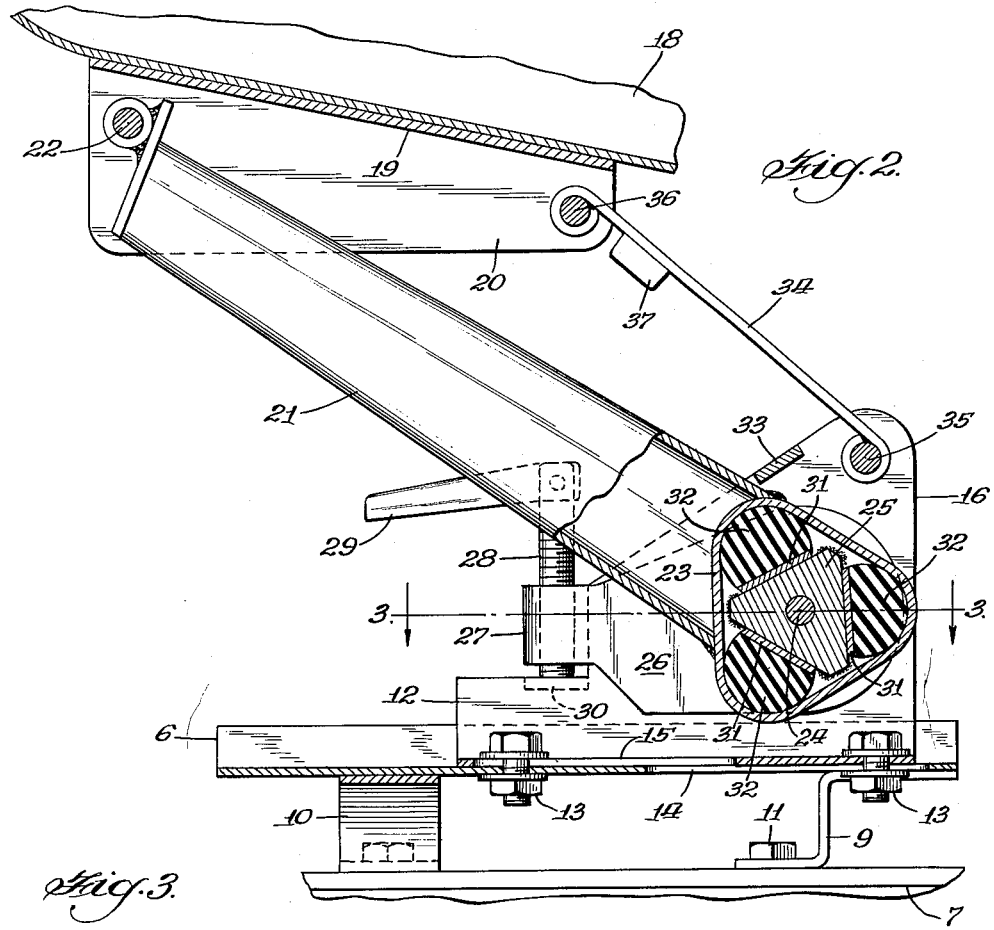
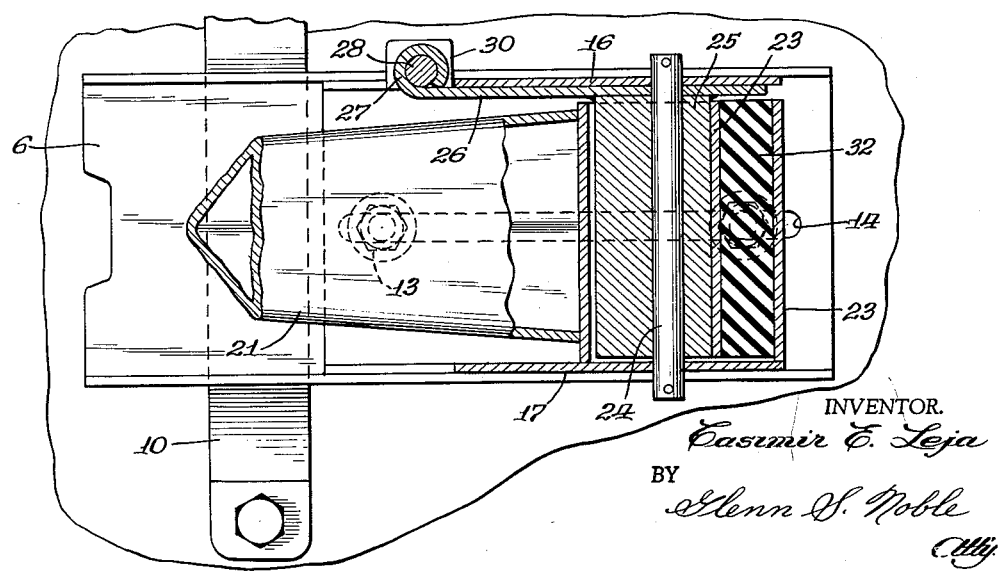
INVENTOR.
Casimir E. Leja
BY Glenn S. Noble
Atty.

United States Patent Office
2,985,227
Patented May 23, 1961

2,985,227
RESILIENT SEAT SUPPORT

Casimir E. Leja, Minooka, Ill., assignor, by direct and mesne assignments, to Komfort King Seats, Inc., a corporation of Illinois, as trustee Filed Sept. 30, 1957, Ser. No. 687,072
4 Claims. (Cl. 155—51)

This invention pertains to seats and supports therefor, particularly intended for use on various types of vehicles such for instance as tractors, combines or other farm equipment. However, certain features of the same made it adaptable for various other uses.

The particular objects of the invention are to provide a seat support having the required resiliency in order to make the seat comfortable in operation and one which does not have any objectionable upward thrust due to changes in the load or position of the operator.

Other objects are to provide a resilient support having compressible elastic members for supporting the weight which members may be for any suitable resilient material such as rubber, rubber compounds and synthetic rubber.

Other objects and advantages of the invention will be described more fully hereinafter in connection with the accompanying drawings in which, Fig. 1 is a fragmentary view of a portion of the tractor with my improved seat mounted thereon.

Fig. 2 is an enlarged view of the seat support shown in Fig. 1 with parts broken away to show the inner construction.

Fig. 3 is a sectional plan view taken on the line 3—3 of Fig. 2; and

Fig. 4 is a perspective view of a supporting member showing an adjusting arm secured to one end thereof.

The support has a channel-shaped base plate 6 which is secured to the transmission box 7 or other portion of the tractor 8 by means of brackets 9 and 10 and bolts 11. A supporting base 12 is slidably mounted on the plate 6 and may be adjusted by bolts 13 which extend through slots 14 and 15 in the plate 6 and base 12 respectively as shown in Fig. 2. The sides of the base are bent upwardly to provide triangular shaped side walls 16 and 17.

The seat 18 has a channel-shaped supporting member or plate 19 with downwardly extending flanges 20. A supporting arm 21 of the shape shown in Figs. 2 and 3 is pivotally secured to the flanges 20 by a cross bolt 22 and has a triangular shaped metal housing member or end piece 23 which is mounted between the side walls 16 and 17. A bolt 24 extends through the end piece 23 and the side walls 16 and 17 and carries a triangular shaped center member 25. This center supporting member has an adjusting arm 26 secured to one end thereof as shown in Fig. 4. The arm 26 has a threaded lug 27 at its outer end for receiving an adjusting screw 28 which is provided with a pivoted handle 29 and which engages with a lug or pad 30 on one of the flanges of the base 12. The resilient compression members 32 are provided with anti-friction plates 31 which may be made of any suitable material to reduce the friction between the triangular member and the resilient compression members 32. The plates 31 are preferably bonded to the compression members and are also used to prevent the compression members 32 from rotating or being displaced when compressed under load as the supporting arm is moved downward. The compression members are formed of rubber, synthetic rubber or other suitable elastic material and fit snugly between the faces of the central member 25 and the apices of the triangular member 23 as shown particularly in Fig. 2. The arm 21 is limited in its upward movement by a cross bar 33 extending between the side walls 16 and 17. The seat and the side walls 16 and 17 are further connected by means of a link 34 which engages with a bolt 35 between the side walls and the bolt 36 between the flanges of the seat engaging member 20. The link 34 is provided with a resilient lug or buffer 37 which engages with the arm 21 when the seat is depressed to a predetermined position. The link and arm provide a parallel motion which keeps the seat in substantially horizontal position.

When the operator sits on the seat, it will tend to move downwardly, thus swinging the main supporting arm 21 and such movement is resisted by the several compression members as the triangular casing member 23 tends to rotate with respect to the relatively fixed triangular supporting member 25. If the compression members are rubber or the like, and contact directly with the triangular member 25, the friction will be excessive, but this is overcome by the anti-friction plates 31. The device may be adjusted for greater or lower loads by turning the adjusting screw 28 which will adjust the central triangular member 25 with respect to the casing member 23 and thus increase or decrease the pressure on the resilient elements. In this manner, the support may be regulated for operators of different weight and the device will provide smooth riding qualities for tractors or the like and there will be substantially no upward thrust as are occasioned in the present seat supports using springs. In the case of a sudden jolt, the snubber 37 will prevent the metal parts from striking together.

While I have described my invention particularly with respect to tractors or similar apparatus, certain features thereof may be adapted for various uses.

What I claim is:

1. In a support of the character set forth, the combination of a base, means for securing the base to a vehicle, said base having parallel upwardly extending side pieces, a bolt extending through the side pieces, a triangular supporting member mounted on the bolt, a supporting member defining a triangular inner area around the first named support member, resilient compression members interposed between the faces of the first named member and the apices of the second named member, anti-friction plates secured to said compression members and engaging with the faces of the triangular supporting member, means for adjusting the angular position of the first named member with respect to the outer member comprising an arm extending from the triangular center supporting member, a threaded lug at the outer end of said arm, an adjusting screw engaging with said lug, a pivoted handle on the adjusting screw and a pad on the base for engagement with said screw, an arm extending upwardly from the outer member, means for pivotally connecting the arm to the seat, and a link between the sides of the base and the seat.

2. In a resilient seat support, the combination of a base plate, means for securing the plate to a vehicle, a supporting base mounted on the base plate and having upwardly extending sides, a supporting member of substantially triangular cross section rotatably mounted between said sides, a tubular triangular supporting member around the first named member, resilient compression members between the faces of the first named member and sides of the tubular member, metal plates bonded between the compression members and slidably engaging the adjacent contacting faces of the triangular member, means for adjusting the angular position of the supporting members with respect to each other to regulate the tension on the seat, an arm extending upwardly from the tubular supporting member, the seat, means connecting the seat with the arm and the link between the seat and the sides of the base.

3. A resilient support for seats including a base frame, a substantially triangular supporting member rotatably mounted in the frame, a second triangular supporting member surrounding the first named member, resilient compression members between the faces of the first named member and the inner sides of the second member which fit closely in the second member to avoid rotation thereof, anti-friction plates on the resilient compression members for engagement with the sides of the triangular supporting member to reduce friction and to prevent rotation of said compression members, means for adjusting the angular position of said members with respect to each other for regulating the tension on the seat for persons of different weights, an arm extending upwardly from the outer member, a seat and means for pivotally connecting the arm with the seat.

4. In a resilient support for seats, the combination of a seat, an arm pivotally connected to the seat and extending downwardly and forwardly therefrom, a triangular tubular supporting element positioned transversely at the lower end of the arm and fixed thereto, a supporting base, means for securing the supporting base to a vehicle, a shaft mounted transversely in the supporting base, a triangular metallic supporting member mounted on the shaft, an arm extending from the transverse supporting member, a screw mounted in the arm and adapted to contact with the base for adjusting the supporting member to accommodate persons of different weights, resilient pads between the sides of the triangular supporting member and the adjacent corners of the first named supporting member, and a link between the base and the seat tending to coact with the arm for holding the seat in horizontal position.

References Cited in the file of this patent

UNITED STATES PATENTS

| | | |
|---|---|---|
| 2,008,209 | Herold | July 16, 1935 |
| 2,533,573 | Gabel | Dec. 12, 1950 |
| 2,588,638 | Krotz et al. | Mar. 11, 1952 |
| 2,630,854 | Neher | Mar. 10, 1953 |
| 2,652,880 | Gundersen | Sept. 22, 1953 |
| 2,712,742 | Neidhart | July 12, 1955 |
| 2,760,553 | Lie | Aug. 28, 1956 |
| 2,829,703 | Knoedler | Apr. 8, 1958 |
| 2,856,982 | Leja | Oct. 21, 1958 |

FOREIGN PATENTS

| | | |
|---|---|---|
| 670,770 | Germany | Jan. 26, 1939 |
| 554,802 | Great Britain | July 20, 1943 |